US009648285B2

(12) United States Patent
Traff et al.

(10) Patent No.: US 9,648,285 B2
(45) Date of Patent: May 9, 2017

(54) MONITORING METHOD AND CAMERA

(71) Applicant: Axis AB, Lund (SE)

(72) Inventors: Gustav Traff, Lund (SE); Anis Ben Hamida, Malmo (SE); Mikael Pendse, Lund (SE)

(73) Assignee: AXIS AB, Lund (SE)

( * ) Notice: Subject to any disclaimer, the term of this patent is extended or adjusted under 35 U.S.C. 154(b) by 359 days.

(21) Appl. No.: 14/304,284

(22) Filed: Jun. 13, 2014

(65) Prior Publication Data

US 2014/0368646 A1    Dec. 18, 2014

(30) Foreign Application Priority Data

Jun. 14, 2013    (EP) .................................... 13172044

(51) Int. Cl.
H04N 7/18       (2006.01)
H04N 5/33       (2006.01)
G06K 9/00       (2006.01)
G08B 13/196     (2006.01)
G06K 9/20       (2006.01)

(52) U.S. Cl.
CPC .......... H04N 7/181 (2013.01); G06K 9/00771 (2013.01); G06K 9/2018 (2013.01); G08B 13/19686 (2013.01); H04N 5/33 (2013.01)

(58) Field of Classification Search
CPC ...... H04N 7/181; H04N 5/33; G06K 9/00771; G06K 9/2018; G08B 13/19686
See application file for complete search history.

(56) References Cited

U.S. PATENT DOCUMENTS

| 8,107,680 | B2 | 1/2012 | Henson |
| 8,311,275 | B1 | 11/2012 | Berlic et al. |
| 2005/0157169 | A1 | 7/2005 | Brodsky et al. |
| 2009/0046147 | A1 | 2/2009 | Henson |
| 2009/0128632 | A1 | 5/2009 | Goto et al. |
| 2010/0059589 | A1* | 3/2010 | Goncalves ......... G06K 9/00771 235/383 |

(Continued)

FOREIGN PATENT DOCUMENTS

| JP | 2006-304250 A | 11/2006 |
| JP | 2007-274655 A | 10/2007 |
| JP | 2010-193227 A | 9/2010 |

OTHER PUBLICATIONS

Partial European Search Report issued Oct. 11, 2013 in Patent Application No. 13172044.3.

(Continued)

*Primary Examiner* — Kate Luo
(74) *Attorney, Agent, or Firm* — Oblon, McClelland, Maier & Neustadt, L.L.P.

(57) ABSTRACT

A scene is monitored by receiving image data representing a thermal image captured by a thermal image sensor (13) and a visual image captured by a visual image sensor (15), the thermal image and the visual image depicting a same view of the scene. Objects (9) are detected in the visual image and in the thermal image. A mask (17a) is defined in the view of the scene, and it is determined if an object (9) or an object part, inside the mask (17a), is present in both the thermal image and the visual image. If so, a modified mask (17b) is provided by excluding an area occupied by the object (9) or the object part from the mask (17a).

17 Claims, 2 Drawing Sheets

(56) References Cited

U.S. PATENT DOCUMENTS

2011/0262019 A1* 10/2011 Shen ................. G06T 11/001
  382/131
2013/0050502 A1* 2/2013 Saito ..................... G06T 7/20
  348/169

OTHER PUBLICATIONS

Extended European Search Report issued Jan. 28, 2014 in Patent Application No. 13172044.3.
Andrew Senior (Ed), "Protecting Privacy in Video Surveillance", Springer, XP002713957,(Jan. 1, 2009), pp. 11-33, 147-15, * p. 24 and 150 *.
John Honovich, "Reducing Bandwidth Through Privacy Masks?", I PVM, XP002713958, (Apr. 23, 2012), Retrieved from the Internet: URL:http://ipvm.com/report/bandwidth privacy masks—[retrieved on Sep. 23, 2013] * the whole document *, 2 pages.
Guillaume-Alexandre Bilodeau, et al., "Silhouette-based features for visible-infrared registration", Computer Vision and Pattern Recognition Workshops (CVPRW), 2011 IEEE Computer Society Conference on, IEEE, XP031926460, (Jun. 20, 2011), pp. 68-73, * sect.2 *.
Praveen Kumar, et al., "Fusion of Thermal Infrared and Visible Spectrum Video for Robust Surveillance", Computer Vision, Graphics and Image Processing Lecture Notes in Computer Science; LNCS 4338, Springer, XP019053044, (Jan. 1, 2007), pp. 528-539, * sect.2, 3 *.
James W. Davis, et al., "Background-subtraction using contour-based fusion of thermal and visible imagery", Computer Vision and Image Understanding, vol. 106, No. 2-3, XP022077225, (May 4, 2007), pp. 162-182, * sect.3.2 *.

* cited by examiner

MONITORING METHOD AND CAMERA

TECHNICAL FIELD

The present invention relates to a camera, a video encoder, and a method of monitoring a scene.

BACKGROUND

Cameras are used in many different applications, both indoors and outdoors, to monitor a variety of environments. In certain situations there may be a need to treat one part of a captured image different from another part, such as when there is a need to mask part of an image in a situation where a camera is placed inside a building or inside a bus or a train and the environment outside is to be excluded from the monitoring done by the camera. Another example is when a building with windows is monitored and there is a need to avoid monitoring the inside of the building through the window.

In such instances, a privacy mask may be defined by an operator during set-up of the surveillance equipment. The operator would usually create the mask by marking the window to be masked on the image in a graphical user interface.

However, improvements in this area are still of interest.

SUMMARY OF THE INVENTION

It is an object of the present invention to provide an improved way of selecting a part of an image for certain types of processing.

According to a first aspect of the invention a method of monitoring a scene by a camera comprises the steps of: receiving image data representing a thermal image captured by a thermal image sensor and a visual image captured by a visual image sensor, the thermal image and the visual image depicting a same view of the scene; detecting objects in the visual image and in the thermal image; defining a mask in the view of the scene; determining if an object or an object part, inside the mask, is present in both the thermal image and the visual image, and, if so, providing a modified mask by excluding an area occupied by the object or the object part from the mask.

The mask may e.g. be defined to cover a window present in the view of the scene. The invention provides a way to hide what goes on behind a see-through surface, such as a window or a glass door, which is placed in the view of the scene at some distance from the camera, while allowing the camera to see objects in the form of persons or motor vehicles which are present between the masked surface and the camera. This is possible since the far-infrared radiation which is captured by the thermal sensor does not pass through such surfaces, in contrast to the radiation in the visible light spectrum which is captured by the visual camera. In other words, the methods of the invention may be used to provide a dynamic mask covering a window, which adapts to objects moving in front of a window, but still masks what is on the other side of the window.

The mask may be a privacy mask and the method may further comprise the step of displaying the visual image, wherein image data inside the modified mask is hidden from being displayed, such as by blurring, pixelating or substituting.

Such a privacy mask could e.g. be used to hide the inside of a shop, while allowing the camera to monitor any persons on the outside of the shop, in order to prevent any break-in attempts. Or, as an alternative, it could be used when monitoring the inside of a building, while hiding the view to the outside through a window, in a case when it is not desired or even allowed to monitor the outside environment.

Additionally or as an alternative, the mask may be used to select which image data to use to set imaging parameters, or in other words, the method may further comprise the step of setting imaging parameters, such as color scheme, brightness or white balance, for the visual image based on image data of the visual image, wherein image data inside the modified mask is excluded. The mask may also be used to select image data for adjusting camera settings, or in other words, the method may comprise the step of adjusting camera settings, such as exposure, focus or ISO-value, for the visual image sensor, based on image data of the visual image, wherein image data inside the modified mask is excluded. In this way it is made sure that objects in front of and next to a bright window can be depicted in a useful way.

The method may further comprise the step of compressing the image data of the visual image inside the modified mask at a first compression ratio, and compressing the remaining image data of the visual image at a second compression ratio which is lower than the first compression ratio. In this way bandwidth may be saved by adapting the compression rate so that less interesting areas of an image take up less bandwidth.

The step of determining if an object or object part, inside the mask, is present in both the thermal image and the visual image may comprise comparing object feature descriptors, such as object tracking history or specific feature points from a SIFT or SURF algorithm. In this way a simplified and secure mapping of objects between the two images may be accomplished.

Alternatively or additionally, the step of determining of an object or object part, inside the mask, is present in both the thermal image and the visual image may comprise: for pixels in the thermal image where an object is detected, checking if an object is detected in corresponding pixels in the visual image; counting the number of pixels where there is a match for the object; determining a ratio between the number of matching pixels and a total number of pixels belonging to the object detected in the thermal image; and comparing the ratio to a threshold value, and if the ratio is below the threshold value, determining that the object only is present in the thermal image. This provides a robust and simple way of checking if an object is present in both images.

The step of determining if an object or part of an object, inside the mask, is present in both the thermal image and the visual image may additionally or alternatively comprise: computing gradients of the thermal image and the visual image, and for the pixels in the thermal image that have a gradient magnitude above a magnitude threshold value, comparing the gradient in each pixel to the gradient of corresponding pixels in the visual image, and assigning a match score to each pixel depending on degree of correspondence between the gradients; determining a sum of the match scores for each object in the thermal image, normalizing the sum by dividing by the total number of pixels belonging to the object, and if the sum is below a match score threshold value, determining that the object only is present in the thermal image. This further increases the robustness of the method.

According to a second aspect of the invention a camera arranged to monitor a scene comprises a thermal image sensor arranged to capture a thermal image and a visual image sensor arranged to capture a visual image, the thermal image and the visual image depicting a same view of the scene, an object detector arranged to detect objects in the visual image and in the thermal image, a mask definer arranged to define a mask in the view of the scene, a mask modification unit arranged to determine if an object or an object part, inside the mask, is present in both the thermal image and the visual image, and, if so, provide a modified mask by excluding an area occupied by the object or the object part from the mask.

According to a third aspect of the invention a video encoder is provided which comprises an image input arranged to receive a thermal image captured by a thermal image sensor and a visual image captured by a visual image sensor, the thermal image and the visual image depicting a same view of the scene, an object detector arranged to detect objects in the visual image and in the thermal image, a mask definer arranged to define a mask in the view of the scene, a determination mask modification unit arranged to determine if an object or an object part, inside the mask, is present in both the thermal image and the visual image, and, if so, provide a modified mask by determine that the object or object part is positioned in front of the window in the scene, and excluding an area occupied by the object or the object part in the view of the scene from the mask.

The mask may be a privacy mask and the camera or the video encoder may further comprise a display image output arranged to provide a display image from the visual image, wherein image data inside the modified mask is hidden from display, such as by blurring, pixelating or substituting.

The mask definer may be arranged to define the mask to cover a window present in the view of the scene.

These latter aspects of the invention provide corresponding advantages to the first aspect of the invention.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, a reference to "an object" or "the object" may include several objects, and the like. Furthermore, the word "comprising" does not exclude other elements or steps.

BRIEF DESCRIPTION OF THE DRAWINGS

The invention will now be described in more detail by way of example and with reference to the accompanying schematic drawings, in which.

DETAILED DESCRIPTION OF EMBODIMENTS

Figure 1:
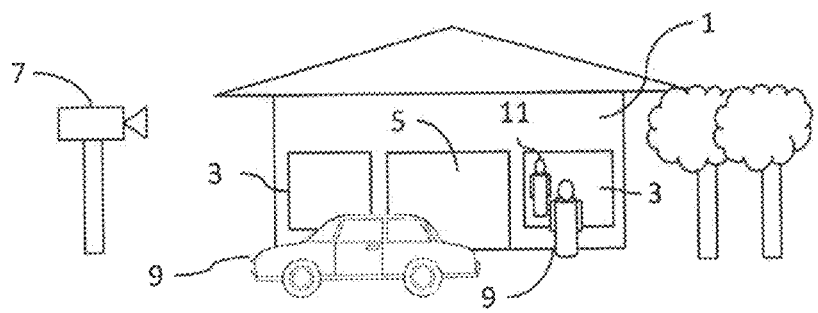
FIG. 1 illustrates a situation where a camera is monitoring a scene.

FIG. 1 illustrates an exemplifying situation where the inventive method and apparatus may be used. FIG. 1 shows a building 1 having large windows 3 and a glass door 5 towards a street. The building 1 may e.g. house an office which is entered through the glass door 5, and people passing by may view the inside of the office through the glass door 5 and windows 3.

In order to increase the security of the premises at off-hours, a camera 7 is monitoring the outside of the building 1, so that e.g. break-in attempts may be discovered and stopped. However, there is no interest in this case in viewing the inside of the building by the camera 7, both for privacy reasons and to reduce the amount of image processing and video storage needed. This could be solved by overlaying a privacy mask on the captured images which covers an area of the image depicting the door 5 and the windows 3.

A privacy mask is an area of the image which is blurred or greyed out or in some manner not shown to a user. However, as the inventors have realized, this may cause a problem when there are objects 9 of interest, such as cars or human beings, in an area between the camera 7 and the actual area to be masked, i.e. the windows. In other words, there is a need to add a privacy mask to the window area in the background without covering the objects 9 in the foreground. This is difficult, not to say impossible, when the privacy mask is defined in the image received from the camera by marking a specific area in the image in a user interface.

A similar situation arises when a store owner needs to monitor areas inside the store but has no permission to monitor the area outside the store. The view to the outside environment, through the store windows and door, therefore needs to be masked by privacy masks in the video from the camera. However, there might still be interesting parts in the store which are located between the camera and the door or windows and which should be available for viewing in the video from the camera.

Yet another example is when a camera is mounted in a bus or a train, and only the inside environment should be monitored, not the view of the outside environment through the windows of the vehicle.

To counter these problems, the inventors have designed a way to mask the area behind a window while still being able to show objects which have a different temperature than their environment, such as human beings or other living creatures or motor vehicles, which are present in front of the window, i.e. between the camera and the window.

To this purpose, the camera 7 comprises two image sensors, one thermal image sensor 13 and one visual image sensor 15. Thermal image sensor in this context should be understood as an image sensor which is sensitive to radiation in the far-infrared spectrum, such as a microbolometer, and which produces a thermal image, or thermogram, showing heat radiated by different objects. A visual image sensor in this context is a "normal" image sensor, producing an image which would be similar to what is seen by a human eye. The thermal image and the visual image are combined to find the objects that are present in the masked area, but which are actually in front of a window or other see-through surface, and therefore should be visible, or excluded from the mask.

The thermal image sensor 13 and the visual image sensor 15 both capture images of a same view of the scene, meaning that a specific pixel in the thermal image would depict the same area as the corresponding pixel—or pixels in case there is a difference in resolution—in the visual image. Small deviations may be acceptable between the view that the thermal camera captures and the view which the visual camera captures, as long as there is a reasonable correspondence between the images to make it possible to match objects between the images.

It may be noted that the term "camera" in this context could include the two image sensors, and any optical or other equipment needed to produce images. As an example, the sensors may be located in one and the same camera housing, or they may be placed in separate housings. In order to produce images of the same view of the scene, the most likely configuration would be to place the image sensors 13 and 15 close to each other, but any configuration which would give the sensors essentially the same view of the scene could be used. To minimize deviations, the image sensors could gather electromagnetic radiation from a common optical path that is split with a mirror, prism or lens before entering the two sensors.

Figure 2:
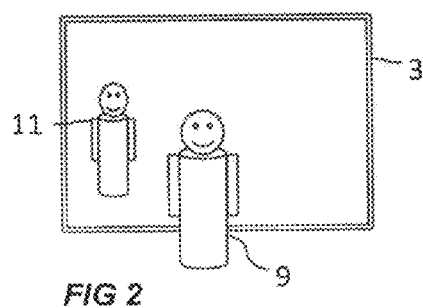
FIG. 2 shows a visual image.
Figure 3:
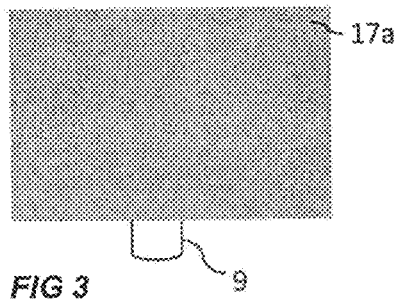
FIG. 3 shows the visual image with a privacy mask applied.

When the thermal image sensor 13 captures an image of the scene in FIG. 1, the person 9 standing in front of the window will be visible, as will the motor vehicle driving by the store. These objects will also be visible in the image captured by the visual camera. Going more into detail, the visual image in the area of one of the windows 3 could look something like what is shown in FIG. 2. Note that a person 11 standing on the other side of the window is also visible in the visual image. FIG. 3 illustrates what the visual image in FIG. 2 would look like when a privacy mask 17*a* covering the window 3 has been added. Note that both the person 11 and the parts of the person 9 that are in front of the window are inside, or covered by the mask 17*a*.

Figure 4:
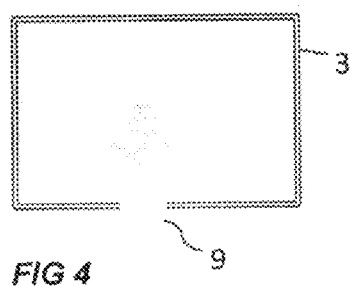
FIG. 4 shows a thermal image.

The image taken by the thermal image sensor 13 would on the other hand look something like what is shown in FIG. 4. The object 9 is grey to symbolize that this is a thermal image where details are not visible in the same way as in a "normal" image. The person standing on the other side of the window 3 is not visible in this image, since the heat, or far-infrared radiation, from the object 11, will not penetrate the window 3. In an image from a thermal camera, reflections of heat from a person standing in front of the window may sometimes occur, but the area of such reflections will still be masked by the method of the current invention, as they will be seen as objects that are only visible in the thermal image, not in the visual image.

Figure 5:
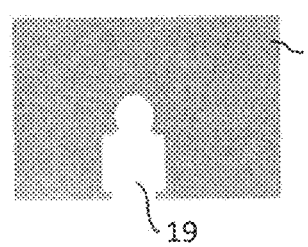
FIG. 5 shows a modified mask.

In FIG. 5, a modified mask 17*b* is shown. This mask is the result of analyzing the visual image and the thermal image and checking if there are any objects inside the mask 17*a* that are present in both the thermal image and in the visual image, and then excluding an area 19 occupied by those objects from the mask to provide the modified mask 17*b*.

The analysis and checking if objects or parts of objects are present in both images may take place in a number of different ways. As a first step, object would be detected in both images. Any type of object detection algorithm could be used, and different algorithms could be chosen for the two images.

In a next step it is checked whether an object or object part inside the mask is present in both images. Generally, some type of object feature descriptor can be used to match the objects to see if one and the same object is present in both images. One example could be to compare the movement paths taken by the detected objects. These paths could be detected by an object tracking algorithm. The movement path could also be denoted object tracking history, or movement history of an object. Another example would be to use some type of specific feature points of the objects for the matching, such as feature points provided by a SIFT, Scale Invariant Feature Transform, or a SURF, Speeded Up Robust Features, algorithm.

Another variant is to use the thermal image as the starting point, and for each object inside the mask in the thermal image, count the pixels for which there is an object detected in the corresponding pixels in the visual image, and, after normalizing by the total number of pixels in the object, comparing this ratio to a threshold to find out if there is a matching object in the visual image or not. If the ratio is below the threshold the object is most likely only present in the thermal image, and that object should not be excluded from the mask. Only the objects which are present in the thermal image and where the ratio is above the threshold will in this way be excluded from the mask. Any objects that are not present in the thermal image will not be excluded from the mask.

In addition or as an alternative it would also be possible to compare gradients of the thermal image and the visual image. More in detail, in this case a comparison of the gradients is done, for those pixels in the thermal image with a gradient magnitude above a magnitude threshold, to the gradients of the corresponding pixels in the visual image, and a match score is assigned to the pixels based on the degree of correspondence between the gradient. The sum of the match scores for an object is then calculated, normalized by the total number of pixels in that object, and compared to a match score threshold value to see if the object is present in both the thermal image and the visual image.

For any method of comparison which is done on a pixel level, it may be noted that in case the resolution of the thermal image is lower than the resolution of the visual image, it would be possible to map several pixels in the visual image to one pixel in the thermal image, or vice versa In any case, when an object or object part inside the mask is found to be present in both the thermal image and the visual image, the area occupied by this object is excluded from the mask 17*a*, in order to provide the modified mask 17*b*.

Figure 6:
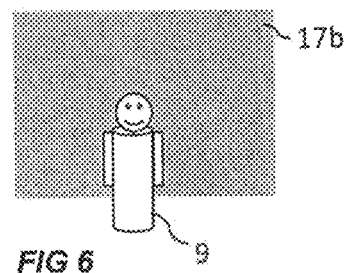
FIG. 6 shows the visual image of FIG. 2 with a privacy mask according to the modified mask of FIG. 5 applied.

In FIG. 6, the visual image from FIG. 2 with a privacy according to the modified mask 17*b* from FIG. 5 applied is shown. Here, the object 9 is visible, but the window 3 and anything behind it is still covered by the modified mask 17*b*. Hence, in this way it is possible to provide a dynamic mask which only covers the window 3 and the area behind it, and not persons 9 or other heat radiating or reflecting objects in front of the window 3. When the object 9 moves, the mask will be updated.

It may be noted that FIGS. 3-6 also may be seen as an illustration of the case when the camera is placed on the inside of the building, with the object 9 standing inside the building in front of the window and the object 11 on the outside of the window.

In the above exemplifying embodiments, a mask to be used as a privacy mask has been discussed. However, the concept presented herein may also be used to control other properties of the image where areas behind a window should be e.g. be ignored or excluded, or in some way treated differently than the rest of the image. As one example, the modified mask may again be used to cover what is behind a window and an imaging parameter, such as white balance, color scheme or brightness, may be set based on the image data of the image excluding the image data representing the parts of the image covered by the modified mask. The image data representing objects in front of the window would be excluded from the modified mask and thereby included in the image data used to set the imaging parameter. The modified mask would then not necessarily be seen in an image output from the camera, it could be used merely to decide which image data should be included in certain types of processing.

Another example could be to use the modified mask to select which image data to use to adjust camera setting such as exposure, focus or ISO-value.

Figure 7:
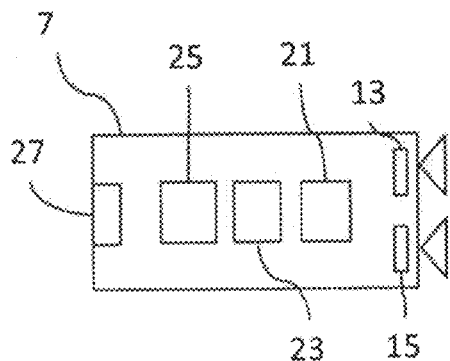
FIG. 7 shows a camera.

In FIG. 7 the camera 7 is shown in more detail. It may be noted that in this figure, the two sensors 13 and 15 and placed in one and the same housing. As mentioned above, this is not necessary; they could be mounted in any way that would provide them with the possibility to capture images of the same view of the scene. The camera further comprises an object detector 21, which is arranged to detect objects in the visual image and in the thermal image. The object detector 21 may implement any type of suitable object detection algorithm, and different methods may be used for the thermal image and the visual image in case that would be appropriate.

The camera 9 also comprises a mask definer 23, which is arranged to define the mask 17a. The mask definer 23 may receive input from an operator via some type of user interface, typically a graphic user interface, which specifies the placement of the mask 17a in the view of the scene. Finally, a mask modification unit 25 is provided which is arranged to first determine if an object, or part of object, inside the mask, is present in both the thermal and the visual image, and if that is the case, remove or exclude the area occupied by the object from the mask or, in other words, exclude the image data representing the object from the mask, in order to provide the modified mask 17b.

The camera 9 may also comprise a display image output 27 which is arranged to provide a display image from the visual image, with the modified mask 17b applied. The mask 17b could in this case function as a privacy mask, and image data inside the modified mask could be hidden from being displayed, such as by blurring, pixelating or substituting, e.g. by a prestored background image.

Figure 8:
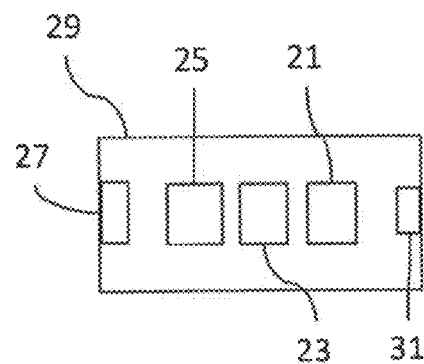
FIG. 8 shows a video encoder.

In FIG. 8 a video encoder 29 is shown which includes an image input 31 for receiving a thermal image and a visual image depicting the same view of a scene. The remaining units in the video encoder correspond to those in the camera 7.

Figure 9:
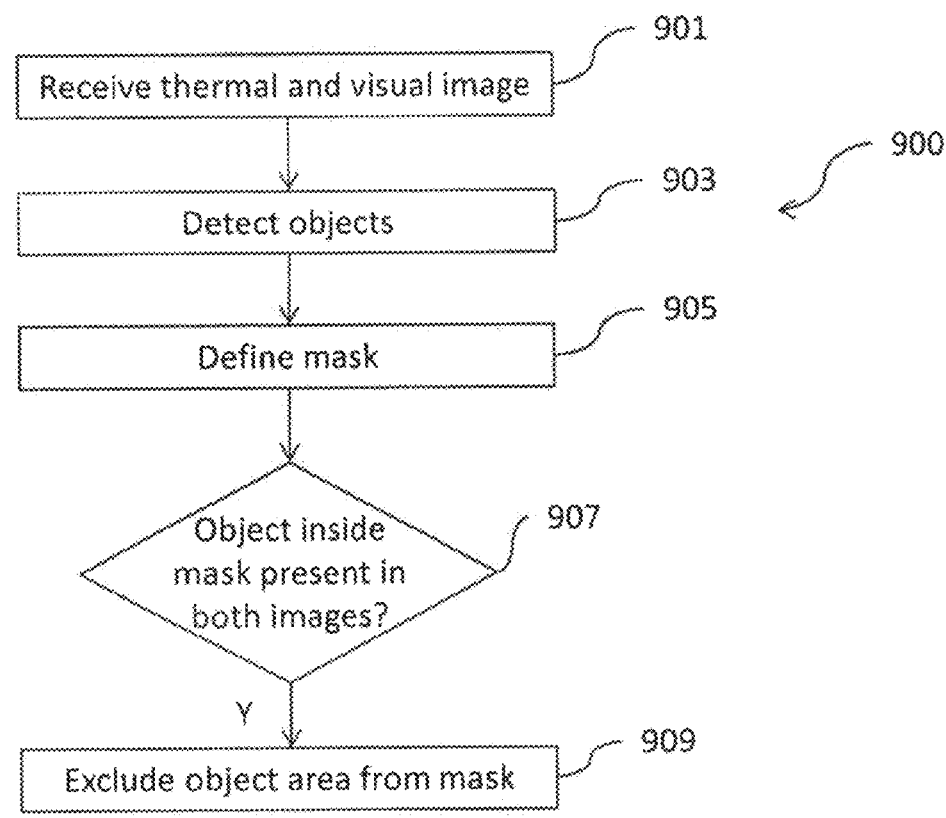
FIG. 9 illustrates a method according to embodiments of the invention.

In FIG. 9 a method 900 according to embodiments of the invention is illustrated. In first step 901, image data representing a visual image and a thermal image depicting a same view of a scene is received. In step 903, objects are detected in the images, and in step 905 a mask is defined in the view of the scene. In step 907 it is checked if an object which is inside the mask is present in both the thermal image and the visual image. If that is the case, in step 909, the area occupied by the object is excluded from the mask so that a modified mask may be provided.

The steps in the method may take place in another order, e.g. the mask may be defined before the objects are detected or after.

It will be appreciated that a person skilled in the art can modify the above described embodiments in many ways and still use the advantages of the invention as shown in the embodiments above. As an example, the various units described herein could be embodied in software or hardware or a combination thereof. It may be noted that the processing of the images may take place in the camera or in the video encoder, which may be placed at a distance from the camera and be connected to the camera via a network. As another example, the camera may be able to change its field of view by panning, tilting or zooming, and still utilize the methods presented herein.

Thus, the invention should not be limited to the shown embodiments but should only be defined by the appended claims.

LIST OF REFERENCE NUMERALS

1: Building
3: Window
5: Glass door
7: Camera
9: Object
11: Object
13: Thermal image sensor
15: Visual image sensor
17a: Mask
17b: Modified mask
19: Area occupied by object
21: Object detector
23: Mask definer
25: Mask modification unit
27: Display image output
29: Video encoder
31: Image input

The invention claimed is:

1. A method of monitoring a scene, the method comprising:
   receiving image data representing a thermal image captured by a thermal image sensor and a visual image captured by a visual image sensor, the thermal image and the visual image depicting a same view of the scene;
   detecting objects which have a different temperature than their environment in the visual image and in the thermal image;
   defining a mask covering a window in the view of the scene; and
   matching the detected objects between the visual image and the thermal image in order to determine if an object or an object part, inside the mask, is present in both the thermal image and the visual image, and, if so, providing a modified mask by excluding an area occupied by the object or the object part from the mask, wherein
   matching the detected objects between the thermal and the visual image in order to determine if an object or object part, inside the mask, is present in both the thermal image and the visual image comprises:
      for pixels in the thermal image where an object is detected, checking if an object is detected in corresponding pixels in the visual image;
      counting the number of pixels where there is a match for the object;
      determining a ratio between the number of matching pixels and a total number of pixels belonging to the object detected in the thermal image; and
      comparing the ratio to a threshold value, and if the ratio is below the threshold value, determining that the object only is present in the thermal image.

2. The method of claim 1, wherein
matching the detected objects between the visual image and the thermal image comprises comparing object tracking histories.

3. The method of claim 1, wherein
the mask is a privacy mask, and
the method further comprises displaying the visual image, wherein image data inside the modified mask is hidden from being displayed.

4. The method of claim 1, further comprising
setting imaging parameters for the visual image based on image data of the visual image, wherein image data inside the modified mask is excluded.

5. The method of claim 1, further comprising:
adjusting camera settings for the visual image sensor based on image data of the visual image, wherein image data inside the modified mask is excluded.

6. The method of claim 1, further comprising:
compressing the image data of the visual image inside the modified mask at a first compression ratio; and
compressing the remaining image data of the visual image at a second compression ratio which is lower than the first compression ratio.

7. The method of claim 1, wherein
determining if an object or object part, inside the mask, is present in both the thermal image and the visual image comprises comparing object feature descriptors or specific feature points from a scale-invariant feature transform (SIFT) or speeded-up robust features (SURF) algorithm.

8. A method of monitoring a scene, the method comprising:
receiving image data representing a thermal image captured by a thermal image sensor and a visual image captured by a visual image sensor, the thermal image and the visual image depicting a same view of the scene;
detecting objects which have a different temperature than their environment in the visual image and in the thermal image;
defining a mask covering a window in the view of the scene; and
matching the detected objects between the visual image and the thermal image in order to determine if an object or an object part, inside the mask, is present in both the thermal image and the visual image, and, if so, providing a modified mask by excluding an area occupied by the object or the object part from the mask, wherein
matching the detected objects between the visual image and the thermal image in order to determine if an object or part of an object, inside the mask, is present in both the thermal image and the visual image comprises:
computing gradients of the thermal image and the visual image;
for the pixels in the thermal image that have a gradient magnitude above a magnitude threshold value, comparing the gradient in each pixel to the gradient of corresponding pixels in the visual image, and assigning a match score to each pixel depending on degree of correspondence between the gradients; and
for each object, determining a sum of the match scores in the thermal image, normalizing the sum by dividing by the total number of pixels belonging to the object, and if the sum for an object is below a match score threshold value, determining that the object only is present in the thermal image.

9. An image processing system comprising:
a camera configured to acquire image data representing a thermal image captured by a thermal image sensor and a visual image captured by a visual image sensor, the thermal image and the visual image depicting a same view of the scene; and
a video processor including hardware configured to execute software stored by a non-transitory computer-readable medium to
detect objects which have a different temperature than their environment in the visual image and in the thermal image;
define a mask covering a window in the view of the scene; and
match the detected objects between the visual image and the thermal image in order to determine if an object or an object part, inside the mask, is present in both the thermal image and the visual image, and, if so, providing a modified mask by excluding an area occupied by the object or the object part from the mask, wherein
matching the detected objects between the thermal and the visual image in order to determine if an object or object part, inside the mask, is present in both the thermal image and the visual image comprises:
for pixels in the thermal image where an object is detected, checking if an object is detected in corresponding pixels in the visual image;
counting the number of pixels where there is a match for the object;
determining a ratio between the number of matching pixels and a total number of pixels belonging to the object detected in the thermal image; and
comparing the ratio to a threshold value, and if the ratio is below the threshold value, determining that the object only is present in the thermal image.

10. The image system of claim 9, wherein the image processing system is the camera including the thermal image sensor and the visual image sensor.

11. The image processing system of claim 9, wherein
the image processing system is a video encoder including a communication interface configured to receive the image data from the camera including the thermal image sensor and the visual image sensor.

12. The image processing system of claim 9, wherein
the video processor is configured to match the detected objects between the visual image and the thermal image by comparing object tracking histories.

13. The image processing system of claim 9, wherein
the mask is a privacy mask, and
the video processor is configured to control displaying the visual image, wherein image data inside the modified mask is hidden from being displayed.

14. The image processing system of claim 9, wherein
the video processor is configured to set imaging parameters for the visual image based on image data of the visual image, wherein image data inside the modified mask is excluded.

15. The image processing system of claim 9, wherein
the video processor is configured to adjust camera settings for the visual image sensor based on image data of the visual image, wherein image data inside the modified mask is excluded.

16. The image processing system of claim 9, wherein the video processor is configured to:
compress the image data of the visual image inside the modified mask at a first compression ratio; and compress the remaining image data of the visual image at a second compression ratio which is lower than the first compression ratio.

17. The image processing system of claim 9, wherein determining if an object or object part, inside the mask, is present in both the thermal image and the visual image includes comparing object feature descriptors or specific feature points from a scale-invariant feature transform (SIFT) or speeded-up robust features (SURF) algorithm.

* * * * *